United States Patent [19]

Megal

[11] Patent Number: 5,484,129
[45] Date of Patent: Jan. 16, 1996

[54] BEVERAGE HOLDER ARRANGEMENT FOR A GOLF CART

[76] Inventor: Michael D. Megal, 37630 Hayes, Clinton Township, Macomb County, Mich. 48038

[21] Appl. No.: 359,611

[22] Filed: Dec. 20, 1994

[51] Int. Cl.⁶ ........................................ A47K 1/08
[52] U.S. Cl. ........................... 248/311.2; 224/274
[58] Field of Search ............................ 248/146, 311.2, 248/128, 138; 224/274; 220/737

[56] References Cited

U.S. PATENT DOCUMENTS

| | | | |
|---|---|---|---|
| 3,131,842 | 5/1964 | Dingle | 224/274 |
| 3,840,204 | 10/1974 | Thomas | 248/311.2 |
| 4,550,930 | 11/1985 | Proffit | 224/274 |
| 4,858,869 | 8/1989 | Stang | 248/311.2 |
| 5,074,448 | 12/1991 | Wu | 224/274 |
| 5,152,489 | 10/1992 | Christensen | 224/274 X |
| 5,244,114 | 9/1993 | Traegde | 220/737 |

*Primary Examiner*—J. Franklin Foss
*Attorney, Agent, or Firm*—John R. Benefiel

[57] ABSTRACT

A beverage container holder arrangement for a collapsible golf cart is disclosed, in which a bracket is fastened to an upright stanchion of the cart to which a foldable handle is mounted. A post extends to one side of the stanchion and holds a bracket to which is pivotally attached a U-shaped bail, a beverage container receptacle pivotally mounted between the bail legs. Two-axis tilting is enabled to maintain a level condition of the beverage. The mounting location allows collapsing of the cart without removal of the holder arrangement.

6 Claims, 2 Drawing Sheets

BEVERAGE HOLDER ARRANGEMENT FOR A GOLF CART

FIELD OF THE INVENTION

This invention concerns a beverage container holder for a golf cart.

BACKGROUND OF THE INVENTION

Beverage containers such as soft drink cans or bottles are often carried along with a golfer on the course, and beverage holders have heretofore been devised for the convenience of the golfer.

Typically, a bracket is clamped or screwed to the handle of a golf cart, which bracket in turn supports a receptacle configured to received a beverage can or bottle.

Such holders are described in U.S. Pat. No. 3,131,842, issued on May 5, 1964 for a "Carrier Attachment for Golf Bag Carts"; U.S. Pat. No. 4,844,399, issued on Jul. 4, 1989 for a "Golf Bag Cart Beverage Holder"; U.S. Pat. No. 5,320,263, issued on Jun. 14, 1994 for a "Golf Cart Beverage Support"; and, U.S. Pat. No. 3,269,683, issued on Aug. 30, 1966 for a "Carrier Attachment for Open-Top Containers".

Such arrangement is convenient, but has the disadvantage of interfering with the operation of collapsible golf carts, in which the handle folds down and the wheels are swung in by rods pulled by the handle. Another disadvantage of this design is that the beverage container is not conveniently accessible when disposed beneath the handle, or is in the way when suspended to the side of the handle.

The high location also accentuates the jostling motion imparted by the cart as it is pulled along.

Gimballed or pivoted receptacles have heretofore been used as described in U.S. Pat. No. 3,840,204, issued on Oct. 8, 1974 for a "Gimbally Mounted Receptacle" and U.S. Pat. No. 5,190,257, issued on Mar. 2, 1993 for a "Beverage Container Holder" but when used with a golf cart, the receptacle is suspended beneath the handle to allow self leveling movement. Again this interferes with collapse of the cart, requiring removal of the holder prior to fold-up of the cart.

It is thus an object of the invention to provide an improved golf cart beverage holder mounting which is more convenient in use and also in fold-up and storage of the golf cart.

SUMMARY OF THE INVENTION

The present invention comprises a beverage holder arrangement for a collapsible cart, including a bracket which is not attached to the golf cart handle, but rather at the top of a stanchion member which supports the golf bag. The mounting is substantially lower than the prior art handle mounts, and a laterally projecting extension tube bolted to the stanchion position a mounting bracket standing off to one side of the top of the stanchion member to clear the golf bag and allow self-leveling movement.

Preferably, an existing mounting bolt hole receives a longer length bolt over which is passed an extension tube which stands off to the side of the stanchion and supports a bracket. The bracket detachably receives a gimbal support having a pivot allowing fore and aft tilting, a U-shaped bail member has legs straddling a receptacle, each leg pivoted to one side of the receptacle to create a second pivot axis oriented to allow lateral swinging of the receptacle in a direction transverse to the pivot axis of the attachment to the bracket. This allows two direction leveling of the receptacle.

The mounting location of the beverage holder eliminates any interference with the collapse of the cart, and allows convenient access to the beverage while keeping the beverage holder out of the way.

DETAILED DESCRIPTION

In the following detailed description, certain specific terminology will be utilized for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
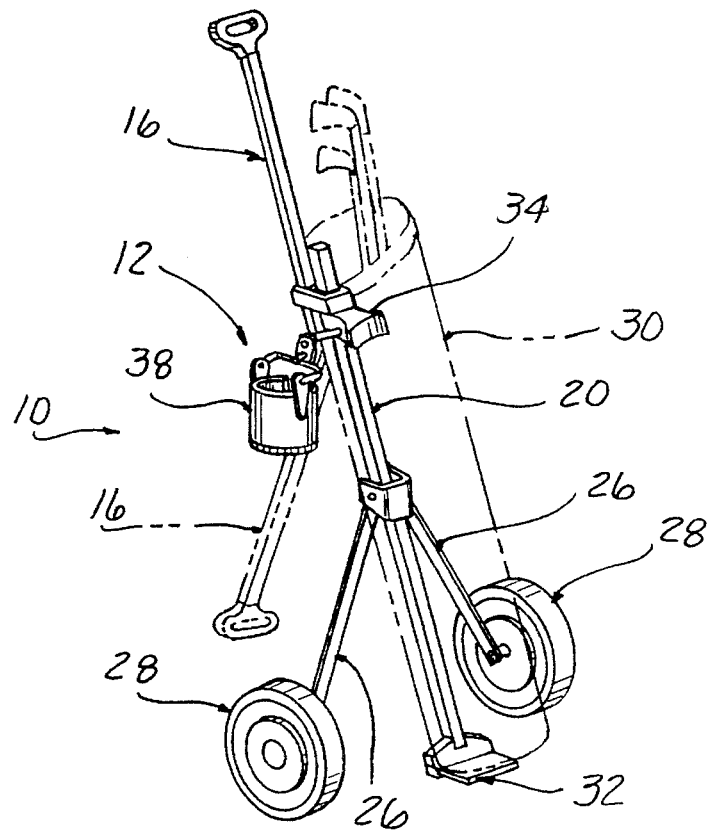
FIG. 1 is a perspective view of a golf cart with the beverage holder arrangement according to the invention, the golf bag shown in phantom.
Figure 2:
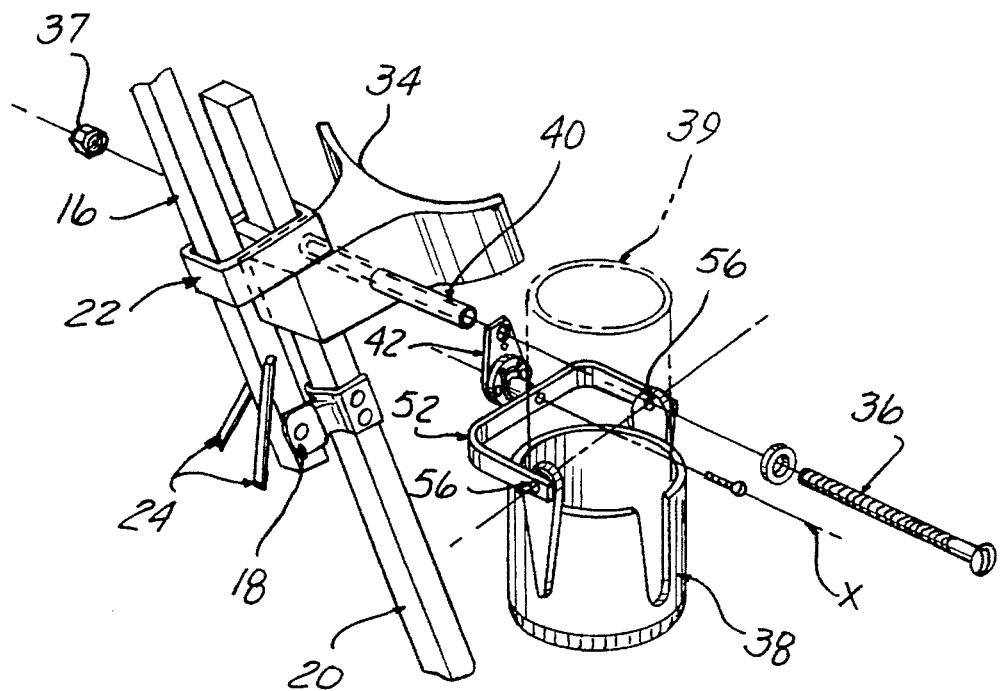
FIG. 2 is an enlarged exploded perspective view of portions of the golf cart and the beverage holder components.

Referring to FIG. 1, a golf cart 10 is shown, which is equipped with the holder arrangement 12 according to the present invention. The golf cart 10 is preferably of the collapsible type, in which the handle member 16 is able to be folded down, pivoting about a connection 18 (FIG. 2) with the upper end of a fixed stanchion member 20.

The handle member 16 is held in the extended position by a slidable clip 22 which is received over the upper end of the stanchion 20 and holds the handle member 16 upright, but which can be slid up to allow the handle member 16 to be folded down for storage.

A pair of rods 24 connect to the wheel supports 26 so as to cause the wheels 28 to be folded in by a linkage (not shown) as another part of the collapsing action.

A golf bag 30 sits on a bottom plate 32 fixed to the bottom of stanchion member 20 and against a rest 34 fixed to the upper end of stanchion member 20 with a screw 36 and mating nut 37.

Such collapsible cart construction is well known and does not itself comprise the invention, and hence is not described herein in further detail.

The holder arrangement 12 includes a receptacle 38 defining a cylindrical well sized to receive a can or bottle container 39. The holder arrangement 12 is not secured to the handle member 16, but rather to the upper end of the stanchion member 20. Bolt 36 not only attaches the bag rest 34, but is longer than the original mounting screw, having a laterally projecting portion received in an extension tube 40.

A bracket 42 is suspended from the projecting end of the screw 36 and tube 40 to be positioned standing off to one side of the stanchion member 20 and rest 34 a substantial distance so as to clear the bag 30. This location allows self-leveling free pivoting action about the axis X transverse to the path of motion of the cart 10.

Figure 3:
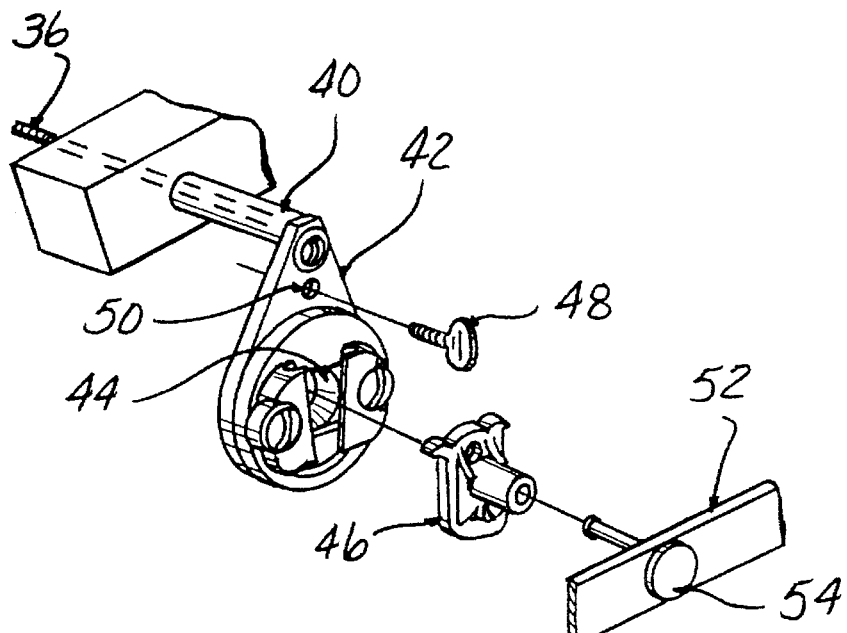
FIG. 3 is a further enlarged exploded perspective view of the bracket components of the beverage holder arrangement shown in FIGS. 1 and 2.

As better seen in FIG. 3, the pendent bracket 42 has an undercut recess 44 adapted to slidably receive a mating piece 46. A thumbscrew 48 is able to be installed in a threaded hole 50 in the bracket 42 just above the recess 44 to hold the piece 46 within the recess 44, the removal of the thumbscrew 48 allowing the piece 46 to be lifted out when desired.

Mating piece 46 is pivotally attached to a U-shaped bail 52 at 54 providing a gimballed support for receptacle 38 by pivots 56, allowing the receptacle to freely swing out to the side since the axis Y extends in the direction of motion of the cart when it is being pulled.

Figure 4:
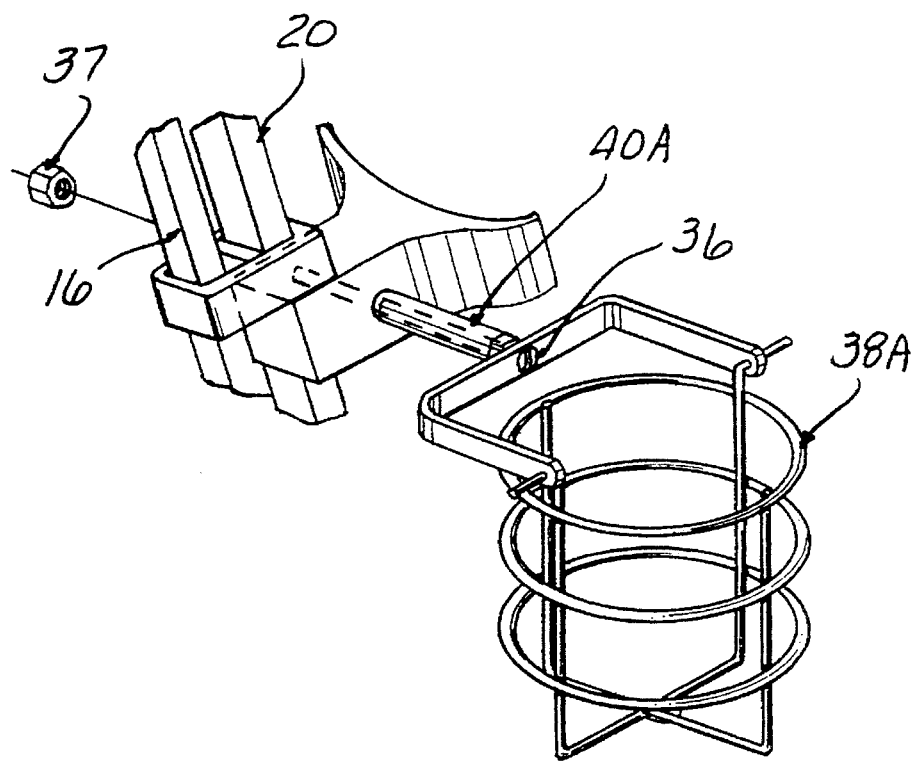
FIG. 4 is an exploded perspective view of an alternate form of the attachment of the beverage holder to the golf cart frame.

FIG. 4 shows an alternate attachment in which a wire form receptacle 38A is suspended from bail 52A, the bail 52A directly held against a standoff extension tube 40A. This simplifies the installation by eliminating the separate bracket 42.

The sideways self-leveling to compensate for lateral swaying is rendered more effective by this orientation of the gimbal axis Y, since sudden lurches occur more often in this direction, spillage is reduced.

At the same time, the X pivot axis orientation allow front-to-rear self plumbing of the receptacle 38. The pivot accommodates changes in inclination of the handle member 16, which usually occur more gradually than the sideways sudden lurches.

The receptacle 38 is held out of the way, yet readily accessible. It can be left on when the handle member 16 is folded since it does not travel with the handle member 16, nor get in the way of the piece 22 when the piece 22 is slid up to prepare for folding of the handle member 16 as the cart is collapsed. The lower location reduces the amplitude of motion induced by the cart rolling over uneven terrain from that which would occur with the higher handle mounted receptacles, while effectively allowing self-leveling action.

I claim:

1. A beverage container holder arrangement for a wheeled golf cart having an upright stanchion member for supporting a golf bag on a bottom plate and against an upper rest, both said bottom plate and said upper rest supported by said stanchion member, and a handle member mounted to an upper end of said stanchion and extending upwardly therefrom above said upper rest, said holder arrangement including a post extending horizontally and laterally from said upper end of said stanchion member at the level of the upper part of a golf bag leaning against said upper rest, a U-shaped bail having a pair of legs joined by a connecting portion, means pivotally supporting said bail on a projecting end of said post to be freely swingable in a fore and aft direction, and a cylindrical beverage container receptacle received between said bail legs and either side of said beverage container receptacle pivotally attached to a respective leg to be freely swingable laterally, whereby said beverage container receptacle is held laterally away from said upper end of said stanchion member by said post and is self-leveling by tilting on said post in fore and aft and lateral directions about transverse axes.

2. The beverage container holder arrangement according to claim 1 wherein said means supporting said bail on said post end includes a bracket having a recess feature and an insert piece, said insert piece pivotally attached to said bail and slidably received in said recess.

3. The beverage container holder arrangement according to claim 2 further including a threaded thumbscrew received in said bracket to retain said insert piece in said recess.

4. The beverage container holder arrangement according to claim 1 wherein said golf cart is collapsible, said handle member foldably mounted to said stanchion member, said holder mounting thereby not interfering with collapse of said cart.

5. The beverage container holder arrangement according to claim 1 wherein said golf cart golf bag upper rest is mounted to said stanchion member with an elongated fastener extending transversely to said stanchion member, said post comprising a tube received over said threaded fastener and thereby held against one side of said stanchion.

6. The beverage container holder arrangement according to claim 4 wherein said wheeled golf cart includes a slidable piece mounted on said upper end of said stanchion member holding said handle member in an extended position, but slidable up and off said stanchion upper end, said post located below said slidable piece to not interfere with upward sliding movement of said piece.

* * * * *